United States Patent
Golubitsky et al.

(10) Patent No.: US 11,843,513 B2
(45) Date of Patent: Dec. 12, 2023

(54) HETEROGENEOUS GRAPH CLUSTERING USING A POINTWISE MUTUAL INFORMATION CRITERION

(71) Applicant: Google LLC, Mountain View, CA (US)

(72) Inventors: Oleg Golubitsky, Toronto (CA); Pushkarini Hemchandra Agharkar, Toronto (CA); Dake He, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/799,428

(22) PCT Filed: Feb. 24, 2020

(86) PCT No.: PCT/US2020/019477
§ 371 (c)(1),
(2) Date: Aug. 12, 2022

(87) PCT Pub. No.: WO2021/173114
PCT Pub. Date: Sep. 2, 2021

(65) Prior Publication Data
US 2023/0080618 A1    Mar. 16, 2023

(51) Int. Cl.
*H04L 41/142* (2022.01)
*H04L 41/12* (2022.01)

(52) U.S. Cl.
CPC ............ *H04L 41/142* (2013.01); *H04L 41/12* (2013.01)

(58) Field of Classification Search
CPC ... H04L 41/142; H04L 41/12; H04L 63/1425; H04L 63/1441; G06F 3/0484
See application file for complete search history.

(56) References Cited

U.S. PATENT DOCUMENTS

| | | | |
|---|---|---|---|
| 8,959,643 B1* | 2/2015 | Invernizzi | H04L 63/1425 713/188 |
| 9,009,192 B1* | 4/2015 | Shmiel | G06F 16/9024 707/750 |

(Continued)

FOREIGN PATENT DOCUMENTS

WO    WO 2017/165677    9/2017

OTHER PUBLICATIONS

Huang et al., Heterogeneous Graph Attention Networks for Early Detection of Rumors on Twitter, Jun. 10, 2020, arXiv, pp. 1-8. (Year: 2020).*

(Continued)

*Primary Examiner* — Muhammad Raza
(74) *Attorney, Agent, or Firm* — Dority & Manning, P.A.

(57) ABSTRACT

Systems and methods of enforcing policies in a computer environment for content distribution using pointwise mutual information (PMI) based clustering are provided. The system can maintain a network of nodes representing a plurality of assets. Upon detecting that an asset is associated with a policy label, the system can identify attributes of the asset and compute a PMI score indicating whether nodes of the network sharing the attributes belong to a single content source. Upon determining that the PMI score exceeds a predefined threshold value, the system can identify a cluster of nodes including the nodes sharing the attributes. The system can tag the cluster, for example, as being associated with a content source that is associated with the policy label.

18 Claims, 5 Drawing Sheets

(56) References Cited

U.S. PATENT DOCUMENTS

2018/0314834 A1    11/2018  Sander et al.
2020/0125727 A1*    4/2020  Wu ...................... G06F 40/289

OTHER PUBLICATIONS

International Search Report and Written Opinion for Application No. PCT/US2020/019477, dated Feb. 24, 2020, 16 pages.
Ni et al., "File relation graph based malware detection using label propagation", Conference on Web Information Systems Engineering, 2015, pp. 164-176.
International Preliminary Report on Patentability for Application No. PCT/US2020/019477, dated Sep. 9, 2022, 14 pages.

\* cited by examiner

HETEROGENEOUS GRAPH CLUSTERING USING A POINTWISE MUTUAL INFORMATION CRITERION

PRIORITY CLAIM

This application is based upon and claims the right of priority under 35 U.S.C. § 371 to International Application No. PCT/US2020/019477 filed on Feb. 24, 2020, which is incorporated by reference herein.

BACKGROUND

In a computer-networked environment such as the internet, third-party content providers provide third-party content items for display on end-user computing devices. These third-party content items, for example, texts, software programs, images and/or videos, can be displayed on a web page associated with a respective publisher, a client application, or a gaming application among others.

SUMMARY

At least one aspect is directed to a system comprising at least one processor and a memory storing computer-executable instructions. The computer-executable instructions, when executed by the at least one processor, can cause the at least one processor to: maintain a heterogeneous network of nodes including a plurality of nodes and edges connecting respective pairs of nodes. Each node of the plurality of nodes can represent a respective asset of a plurality of assets corresponding to a plurality of content sources. The plurality of assets can include at least one asset of a first asset type and at least one asset of a second asset type. The at least one processor can detect that a first asset of the plurality of assets has a label associated with a policy of a content distribution system. The at least one processor can identify in the heterogeneous network of nodes, a first node associated with the first asset. The at least one processor can identify a combination of two or more attributes of the first node. The at least one processor can compute, for a subset of nodes in the heterogeneous network of nodes, a respective pointwise mutual information (PMI) score indicative of, based on the pairs of nodes, a likelihood that nodes of the subset of nodes having the combination of two or more attributes are associated with a single content source. The at least one processor can identify, using PMI the score associated with the subset of nodes, a cluster of nodes in the heterogeneous network of nodes including the combination of two or more attributes. The at least one processor can store, in one or more data structures, an association between the cluster of nodes and a tag based on the first asset having the label associated with the policy of the content distribution system. The tag can be used to categorize a first set of assets of the plurality of assets corresponding to the cluster of nodes.

At least one aspect is directed to a method comprising a data processing system, including one or more processors, maintaining a heterogeneous network of nodes including a plurality of nodes and edges connecting respective pairs of nodes. Each node of the plurality of nodes can represent a respective asset of a plurality of assets corresponding to a plurality of content sources. The plurality of assets can include at least one asset of a first asset type and at least one asset of a second asset type. The method can include the at least one processor detecting that a first asset of the plurality of assets has a label associated with a policy of a content distribution system. The method can include the at least one processor identifying, in the heterogeneous network of nodes, a first node associated with the first asset. The method can include the at least one processor identifying a combination of two or more attributes of the first node. The method can include the at least one processor computing for a subset of nodes in the heterogeneous network of nodes, a respective pointwise mutual information (PMI) score indicative of, based on the pairs of nodes, a likelihood that nodes of the subset of nodes having the combination of two or more attributes are associated with a single content source. The method can include the at least one processor identifying using the PMI score associated with the subset of nodes, a cluster of nodes in the heterogeneous network of nodes including the combination of two or more attributes. The method can include the at least one processor storing, in one or more data structures, an association between the cluster of nodes and a tag based on the first asset having the label associated with the policy of the content distribution system. The tag used to categorize a first set of assets of the plurality of assets corresponding to the cluster of nodes.

At least one aspect is directed to a non-transitory computer-readable medium storing computer-executable instructions, which when executed by at least one processor, cause the at least one processor to maintain a heterogeneous network of nodes including a plurality of nodes and edges connecting respective pairs of nodes. Each node of the plurality of nodes can represent a respective asset of a plurality of assets corresponding to a plurality of content sources. The plurality of assets can include at least one asset of a first asset type and at least one asset of a second asset type. The at least one processor can detect that a first asset of the plurality of assets has a label associated with a policy of a content distribution system. The at least one processor can identify in the heterogeneous network of nodes, a first node associated with the first asset. The at least one processor can identify a combination of two or more attributes of the first node. The at least one processor can compute, for a subset of nodes in the heterogeneous network of nodes, a respective pointwise mutual information (PMI) score indicative of, based on the pairs of nodes, a likelihood that nodes of the subset of nodes having the combination of two or more attributes are associated with a single content source. The at least one processor can identify, using PMI the score associated with the subset of nodes, a cluster of nodes in the heterogeneous network of nodes including the combination of two or more attributes. The at least one processor can store, in one or more data structures, an association between the cluster of nodes and a tag based on the first asset having the label associated with the policy of the content distribution system. The tag can be used to categorize a first set of assets of the plurality of assets corresponding to the cluster of nodes.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. It will be appreciated that aspects and implementations can be combined and features described in the context of one aspect or implementation can be implemented in the context of other aspects.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
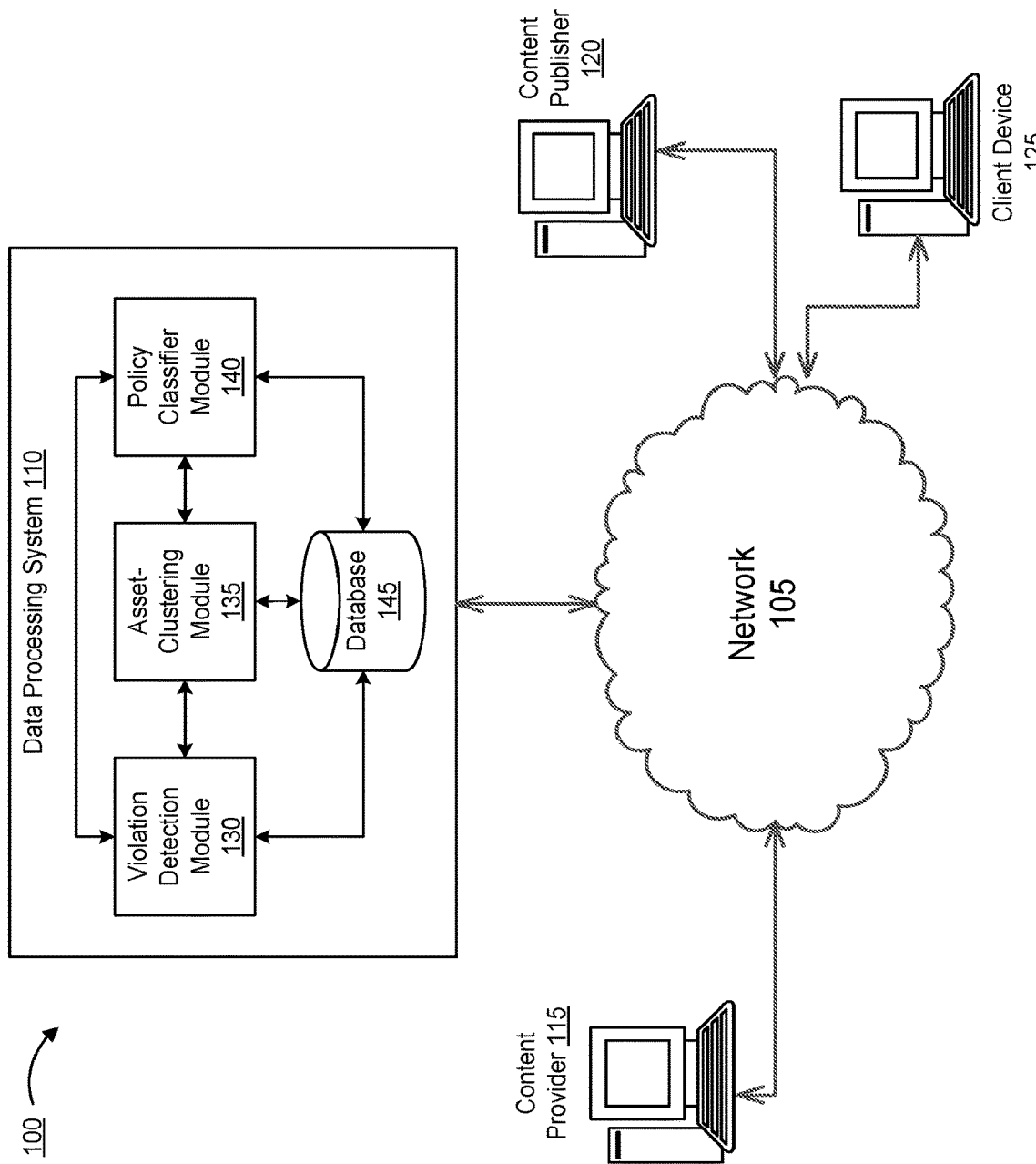
FIG. 1 is a block diagram depicting one implementation of an environment for enforcing policies associated with a content distribution system, according to an illustrative implementation.

Following below are more detailed descriptions of various concepts related to, and implementations of, methods, apparatuses, and systems of enforcing policies in a computer environment for content distribution using a pointwise mutual information (PMI) based clustering approach. The various concepts introduced above and discussed in greater detail below may be implemented in any of numerous ways, as the described concepts are not limited to any particular manner of implementation. For example, while herein content or content items may generally be referred to as advertisements, it will be appreciated that the content or content items may be any suitable content.

A content distribution system, such as an ad distribution system, that serves third-party content (e.g., texts, software programs, images and/or videos) can set policies for activities performed by, or associated with, third-party content providers. For example, the content distribution policies can prohibit activities such as distribution of malicious software, cloaking, or other unacceptable business practices. The content distribution system can monitor activities associated with assets of third-party content providers to determine whether a third-party content provider has engaged in a prohibited activity, a suspicious activity, or other activity categorized or labeled by one or more policies of the content distribution system. Assets of third party content providers can include, for example, third-party content provider accounts, web sites, web domains, landing pages, hosts, IP addresses of the hosts, resources or data files loaded by content items or landing pages from the hosts, or payment information, among others. The third-party content provider accounts can include an account having data related to one or more campaigns.

A content distribution system can maintain a heterogeneous network of nodes representing the assets associated with, or created by, respective third-party providers. The heterogeneous network of nodes can include edges with each edge connecting a respective pair of nodes. Each edge of the heterogeneous network of nodes can be indicative of a relationship (or correlation) between the respective pair of nodes or a corresponding pair of assets. For example, edges of the network of nodes can include an edge between a third-party content provider account and a website that indicates that at least one of the content items of the account has a landing page on that web site. The edges of the network of nodes can include an edge between a third-party content provider account and respective payment information. The edges of the network of nodes can include an edge between a host and a respective IP address. The edges of the network of nodes can include an edge between a host and a resource loaded from that host, among others. Considering that the number of third-party content providers subscribed with the content distribution system and/or the number of assets associated with any given third-party content provider can be relatively large, the total number of nodes of the heterogeneous network of nodes can be extremely large, such as in the millions.

When the content distribution system detects a policy violation or a policy-labeled activity associated with an asset, e.g., a third-party content item, a landing page, or a resource, among others, the content distribution system can tag the asset, stop serving that asset or take other action. In the case of some egregious policy violations, e.g. malware distribution, cloaking, or other unacceptable business practices, the content distribution system can suspend the entire third-party content provider account, and flag or blacklist the related web sites, IP addresses, and/or other resources. In order to impede the reuse of suspicious assets by respective malicious third-party content providers and prevent or delay the recovery of the policy violating accounts from a suspension, it is important for the content distribution system to identify and block all assets of a particular content source (e.g., a third-party content provider or an agent thereof) that committed a policy violation.

Upon detecting a policy violation or a labeled activity or behavior in association with a first asset, the content distribution system can use the heterogeneous network of nodes to automatically identify, label and/or tag all other assets that are related to, e.g., share the same content source as, the first asset. As such, the content distribution system can automatically enforce the respective policies. However, automatic policy-based labeling, classification or tagging of assets calls for very high precision in identifying assets associated with a given content source, to avoid the risk of objections or appeals. Frequent objections or appeals by content sources, e.g., third-party content providers or agents thereof, can be expensive to handle, e.g., in terms of resources' allocation, and can cause reputation damage.

Another aspect of policy-based labeling, classification or tagging of assets is the time gap between the creation or first use of a malicious, suspicious or non-conforming (e.g., not conforming to a given policy) asset and the time it is labeled, tagged or suspended. It is an objective of the content distribution system, or a data processing system thereof, to minimize such time gap, in order to reduce the frequency and risk or potential risk of policy violation. For example, fast detection and suspension (or labeling) of a malicious or non-conforming asset, or malicious or non-conforming content source, can reduce the number of violations committed by that asset or content source, and therefore mitigate the risk to client devices receiving content from the content distribution system. Even if not suspended, fast labeling of the asset or the corresponding content source based on a given policy can allow for, for example, further investigation or monitoring of activities associated with the asset or the content source, warning the content source, or taking other precautionary actions. On the other hand, waiting for a substantial number of assets associated with a given asset cluster to commit violations or engage in non-conforming or suspicious activities or behavior before suspending or labeling the whole cluster can increase the rate of exposure of client devices to such violations or suspicious activities. In some instances, by the time the cluster is suspended, substantial damage to client devices could have occurred already. Such reductions in the time gap between creation or first use and the suspension of a malicious or suspicious asset also reduces resource usage as serving assets which violate or do not conform with a given policy becomes less frequent.

The current disclosure describes methods and system for relatively high precision clustering of assets that correspond to a single content source. A data processing system can generate, using the heterogeneous network of nodes and in a real-time fashion, a cluster of assets that corresponds to a content source committing a detected policy violation. The methods and systems described herein allow for suspension or labeling of assets associated with a malicious, suspicious or non-conforming content source as soon as a policy label is detected in relation with an asset of that malicious, suspicious or non-conforming content source. Specifically, upon detecting that a first asset has (or is associated with) a policy label, the data processing system can identify a cluster of nodes in the heterogeneous network of nodes that represent assets sharing a combination of attributes with the first asset or with another asset related to the first asset. For example, the data processing system can start with a first domain associated with the first asset, and identify all domains sharing the combination of attributes with the first domain. The combination of attributes can include, for example, a payment information, an IP address, a resource, or a combination thereof, among others. The use of more than one attribute in the combination allows for clustering using multi-dimensional relationships between assets.

Policy labels can include labels indicative of a policy violation, whether the asset contains certain information, whether any complaint regarding the asset was received from a user, whether the asset was tagged by one or more other systems, an asset or activity classification or a combination thereof among others. For example, policy labels can be from a finite set, for example, a binary set indicating whether the asset contains certain information or not, or a ternary set with the third label indicating a non-conclusive decision. The cardinality of the set of candidate labels can be greater than 3.

For each node within a subset of nodes (e.g., the nodes representing domains) of the heterogeneous network of nodes, the data processing system can compute, a pointwise mutual information (PMI) score indicative of a likelihood that the combination of attributes is associated with that node. The data processing system can then determine nodes with respective PMI scores exceeding a predefined threshold value as forming a cluster representing assets that share the combination of attributes. The cluster can be viewed as representing the set of assets sharing the same content source (e.g., third-party content provider) as the first asset.

According to example aspects of the current disclosure, systems and methods of automatic enforcement of content distribution policies can include a data processing system maintaining a heterogeneous network of nodes including a plurality of nodes and edges connecting respective pairs of nodes. Each node of the plurality of nodes can represent a respective asset of a plurality of assets corresponding to a plurality of content sources. The plurality of assets can include at least one asset of a first asset type and at least one asset of a second asset type. The data processing system can detect that a first asset of the plurality of assets has, or is associated with, a policy label defined by or associated with a policy of a content distribution system. The data processing system can identify a first node associated with the first asset in the heterogeneous network of nodes. The data processing system can identify a combination of two or more attributes of the first node. The data processing system can compute, for each node of a subset of nodes in the heterogeneous network of nodes, a respective pointwise mutual information (PMI) score indicative of, based on the pairs of nodes, a likelihood that the combination of two or more attributes is associated with the node. The data processing system can identify, using PMI scores associated with the subset of nodes, a cluster of nodes in the heterogeneous network of nodes including the combination of two or more attributes. The data processing system can store, in one or more data structures, an association between the cluster of nodes and a tag based on the first asset having (or being associated with) the policy label related to the policy of the content distribution system. The tag can be used to categorize a first set of assets of the plurality of assets corresponding to the cluster of nodes.

FIG. 1 is a block diagram depicting one implementation of an environment for maintaining the integrity of content distribution among a plurality of computing devices, according to an illustrative implementation. The environment 100 can include at least one data processing system 110, one or more content provider computing devices 115, one or more publisher computing devices 120, one or more client devices 125, and a network 105. The data processing system 110, the one or more content provider computing devices 115, the one or more publisher computing devices 120, and the one or more client devices 125 can be communicatively coupled to each other via the network 105.

The data processing system 110 can include at least one processor (or a processing circuit) and a memory. The memory can store computer-executable instructions that, when executed by the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language. The data processing system 110 can include one or more computing devices or servers that can perform various functions. In some implementations, the data processing system 110 can include an advertising auction system configured to host auctions. In some implementations, the data processing system 110 may not include the advertising auction system, but can be configured to communicate with the advertising auction system via the network 105.

The network 105 can include computer networks such as the Internet, a local area network (LAN), a wide area network (WAN), a metropolitan area networks, one or more intranets, a satellite network, a cellular or network, an optical network, other type of a data network, or a combination thereof. The data processing system 110 can communicate via the network 105 with the one or more content provider computing devices 115, the one or more content publisher computing devices 120, or the one or more client devices 125. The network 105 can include any number of network devices, such as gateways, switches, routers, modems, repeaters, and wireless access points among others. The network 105 can also include computing devices such as computer servers. The network 105 can also include any number of hardwired and/or wireless connections.

The one or more content provider computing devices 115 can include computer servers, personal computers, handheld devices, smart phones, or other computing devices operated by a content provider entity, such as an advertiser or an agent thereof. The one or more content provider computing devices 115 can provide content, such as textual content, image content, video content, animation content, software program content, content items, and/or uniform resource locators among other types of content, to the data processing system 110 for display on information resources. Specifically, the one or more content provider computing devices 115 of a given content provider can be the source of content items or content used to generate content items of that content provider. The content items can be for display in information resources rendered on client devices 125, such as web sites, webpages of search results, client applications, gaming applications or platforms, open source content sharing platforms (e.g., YOUTUBE, DAILYMOTION, or VIMEO), or social media platforms, among others.

The data processing system 110 can provide one or more user interfaces accessible via the content provider computing devices 115 to allow content provider entities, for example, to generate respective content provider accounts, or generate respective campaigns. The user interface(s) can allow content provider entities to upload respective content to the data processing system 110 or other remote systems, or provide respective payment information. In general, the user interface(s) can allow each content provider entity to indicate respective assets used for distribution of content of that entity to client devices 125. As used herein assets of a content provider entity can include content provider accounts, content distribution campaigns, payment information, domain names, hosts, websites or webpages including landing pages, content items (e.g., software programs, images, video segments, text, animation segments, etc.), or resources accessible from the websites, domains or hosts among other assets of the content provider.

The content publisher computing device 120 can include servers or other computing devices operated by a content publishing entity to provide primary content for display via the network 105. The primary content can include websites, webpages, client applications, gaming content, or social media content among others for display on the client devices 125. The primary content can include search results provide by search engines. Pages, video segments or other units of the primary content can include executable instructions, such as instructions associated with content (or ad) slots that cause the client device 125 to request third-party content from the data processing system 110 or other remote systems when the primary content is displayed on the client device. In response to such a request, the data processing system or other remote system can run an auction to determine which content items to provide to the client device 125. In some implementations, the content publisher computing device 120 can include a server for serving (or streaming) video or gaming content.

The client device 125 can include a computing device configured to acquire and display primary content provided by the content publisher computing device 120 as well as content (e.g., third-party content items such as texts, software programs, images, and/or videos) provided by the content provider computing device 115. The client device can request and receive such content via the network 105. The client device 125 can include a desktop computer, laptop computer, tablet device, smartphone, personal digital assistant, mobile device, consumer computing device, server, digital video recorder, set-top box, smart television, video game console, or any other computing device capable of communicating via the network 105 and consuming media content. While FIG. 1 shows a single client device 125, the environment 100 can include a plurality of client devices 125 served by the data processing system 110.

While users of the client devices 125 can select which primary content to access, the client devices may not have much control over the content provided by the content provider computing devices 115 because such content is usually selected automatically by the data processing system 110. Third-party content providers or the respective content provider computing devices 115 can expose the client devices 125 to inappropriate or undesired content, data privacy violations, or cybersecurity threats among other risks. To protect client devices 125 from such risks and maintain the integrity of third-party content distribution, the data processing system 110 can set policies for third-party content providers and/or respective content provider computing devices 115 to abide by. The data processing system 110 can also employ mechanisms to enforce the policies, for example, by detecting violations of the policies or labels associated with the policies and preventing distribution of content associated with policy violators or some policy labels. Once a policy violation or policy label associated with an asset is detected, the data processing system 110 can identify all assets associated with the source of policy violation or the source of asset associated with the policy label and tag such assets, for example, as malicious, suspicious or blocked.

The data processing system 110 can include at least one computer server having one or more processors and memory to store computer-executable instructions. For instance, the data processing system 110 can include a plurality of computer servers located in at least one data center or server farm. In some implementations, the data processing system 110 can include a third-party content placement system, e.g., an ad server or ad placement system. The data processing system 110 can include at least one violation detection module 130, at least one asset clustering module 135, at least one policy classifier module 140 and at least one database 145. Each of the violation detection module 130, the asset-clustering module 135 and the policy classifier module 140 can be implemented as a software module, hardware module or a combination of both. For example, each of these modules can include a processing unit, server, virtual server, circuit, engine, agent, appliance, or other logic device such as programmable logic arrays configured to communicate with the database 145 or with other computing devices via the network 105. The computer-executable instructions of the data processing system 110 can include instructions, which when executed by one or more processors, cause the data processing system 110 to perform operations discussed below with regard to the violation detection module 130, the asset clustering module 135, the policy classifier module 140 or a combination thereof.

The database 145 can maintain a network of nodes that includes a plurality of nodes and edges connecting respective pairs of nodes. Each node of the plurality of nodes can represent a corresponding asset among a plurality of assets of a plurality of content providers or content sources. The database can maintain the network of nodes using one or more data structures, such as a tree, a linked list, a table, a string, or a combination thereof. The database can use the network of nodes (or the one or more data structures) to keep track of the assets used in distributing content to client devices 125. The network of nodes can be a heterogeneous network of nodes including nodes of different types or corresponding to different types of assets. For example, the plurality of assets represented by the nodes of the network of nodes can include at least one asset of a first asset type and at least one asset of a second asset type different from the first asset type. The database can maintain data structures indicative of the policies and respective labels.

Figure 2:
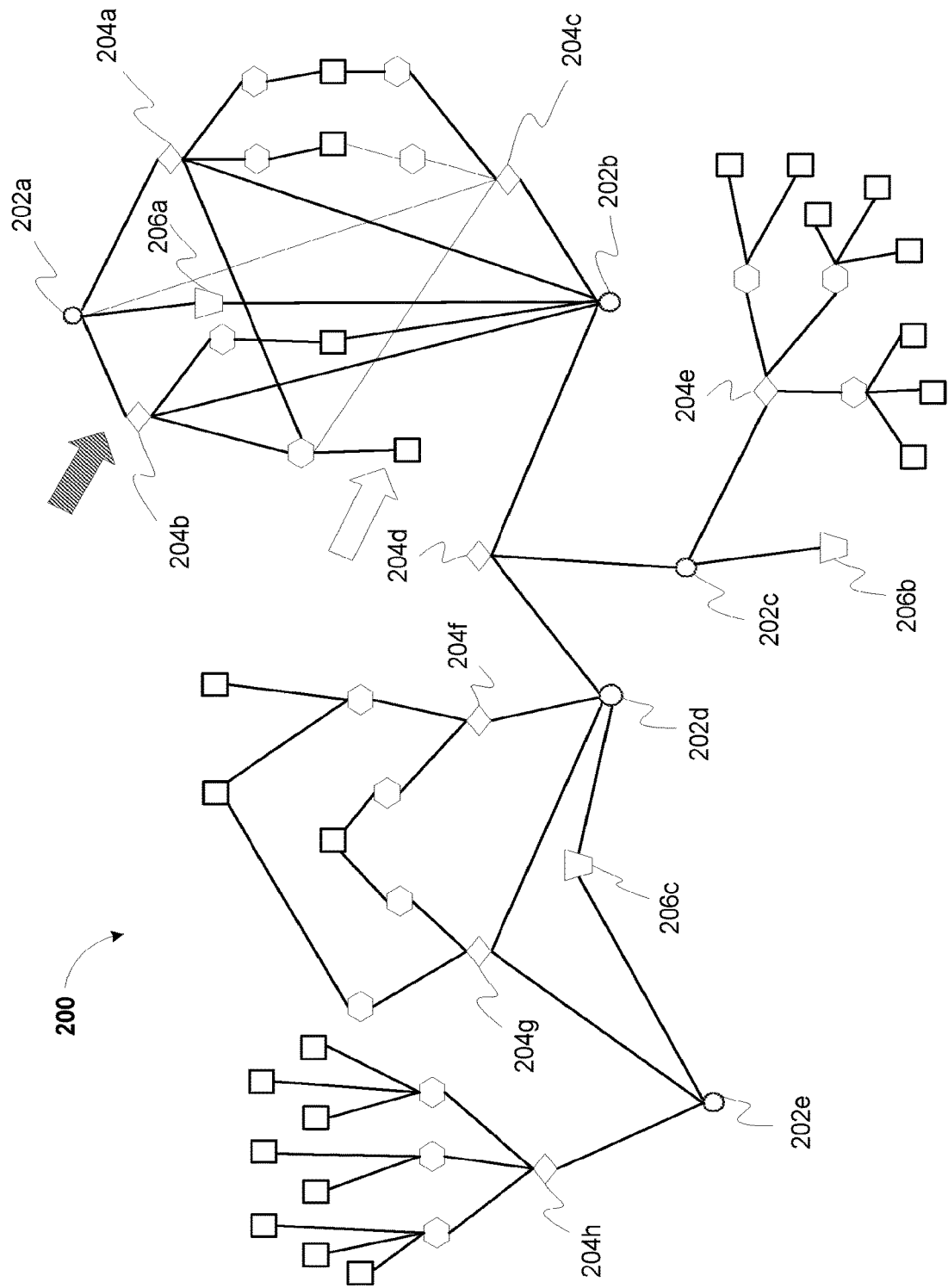
FIG. 2 is a diagram illustrating an example network of nodes, according to an illustrative implementation.

Referring to FIG. 2, a diagram illustrating an example network of nodes 200 is shown. The network of nodes 200 is a heterogeneous network including nodes corresponding to assets of different types. For example, the circle nodes 202a-202e represent content provider accounts. The diamond nodes 204a-204h represent different domains. The hexagonal nodes represent landing pages and the square nodes represent data files of a given type (e.g., video files, text files, or image files among others). The pentagonal nodes represent payment information. Each link of the network of nodes 200 connecting a pair of nodes can represent some relationship between the pair of nodes. For example, a link between a hexagonal node and a square node can indicate that the data file corresponding to the square node is provided by, or can be downloaded from, the landing page represented by the hexagonal node. A link between a circular node, such as one of the nodes 202a-202e, and a diamond node, such as any of the nodes 204a-204h, can indicate that the domain represented by the diamond node either belongs to the content provider account represented by the circular node, or serves content associated with that content provider account. A link between a circular node and a square node can indicate that the data file represented by the square node belongs to the content provider account corresponding to the circular node. Finally, links between pentagonal nodes 206a-206c and circular nodes 202a-202e can indicate the payment information for each content provider account.

In general, edges of a network of nodes, such as the network of nodes 200, can include an edge between a pair of nodes corresponding to, respectively, a web site domain and a content provider account. The edge can indicate that at least one content item associated with the content provider account includes a link referencing an information resource (e.g., a webpage) associated with the website domain. The network of nodes 200 can include an edge between a pair of nodes corresponding to, respectively, a second content provider account and a payment information associated with that content provider account. The payment information can include information related to a bank account, a billing account or an online invoicing account or identifier for charging the cost of serving content associated with the content provider account. The network of nodes 200 can include an edge between a pair of nodes representing, respectively, a web site domain and an IP address associated with the website domain. The IP address can be an address of a host or server associated with web site domain. The network of nodes 200 can include an edge between a pair of nodes including a node representing a web site domain and another node representing an information resource associated with the website domain. The webpage (e.g., a landing page) can be a page provided by the website domain.

The network of nodes 200 of FIG. 2 is provided for illustrative purposes and is not to be interpreted as limiting. For example, the network of nodes 200 can have a larger number and other types of nodes. For example, the network of nodes 200 can include other types of nodes, such as nodes corresponding to IP addresses, various types of resources, or hosts among others. Also, the network of nodes 200 can have more or less links than shown in FIG. 2. The network of nodes 200 can be dynamic as any content provider can add respective new assets or remove respective existing assets over time. Also, new relationships or correlations between existing nodes can be added, for example, by content provider computing devices 115, or discovered by the data processing system 110. Accordingly, the data processing system 110 can update the network of nodes 200, for example, by adding new nodes, adding new links, removing existing nodes, or removing existing links.

The violation detection module 130 can detect violations or policy labels of policies of the data processing system 110, for example, by a third-party content provider, a respective content provider computing device 115, or a respective asset. The policy violation module 130 can rely on feedback from client devices 125 or other computing devices (e.g. a computing device associated with the data processing system 110) reporting malicious, deceptive or otherwise behavior non-conforming with one or more policies associated with a given asset. The malicious, deceptive or otherwise unacceptable behavior can include, for example, distribution of malware, a sneaky redirect or cloaking among other unacceptable practices by third-party content providers or respective assets. A content item, landing page, or other resource from a malicious content source (e.g., a third-party content provider or a respective host or domain) can cause a malware to be downloaded to a client device 125 accessing (or attempting to access) the content item, landing page, or other resource.

Sneaky redirects occur when landing pages are configured to automatically redirect client devices 125 to other pages, which the client device 125 did not intend to access. For example, a client device 125 can receive a content item from the data processing system 110 including a link for a landing page related to the subject matter of the content item. However, upon interaction with the link, the landing page can redirect the client device 125 to some other page, for example, associated with offensive or inappropriate sexual content. Cloaking refers to the practice of presenting different content or URLs to client devices 125 and computing devices associated with a content distribution system (e.g., the data processing system 110 or search engines). A host, website or webpage of a rogue content source can include executable instructions to check whether an IP address of a give computing device is associated with a client device 125 or a content distribution system, and determine which content or URL to provide to the computing device based on the result of the check. As such, the host, website or webpage can present to client devices 125 different content than what is declared to the data processing system 110.

Testing personnel associated with the data processing system 110 can test various assets for any practices or activities that are associated with policy labels of policies of the data processing system 110, and report any relevant policy labels or violations to the violation detection module 130. In some implementations, the violation detection module 130 can detect relevant policy labels (e.g., policy labels that apply to a given asset) automatically. For example, the violation detection module 130 can check whether websites or landing pages associated with content providers include malware. The asset-clustering module 135 can identify the set of attributes are instructions to perform sneaky redirects or check IP addresses to perform cloaking. An asset that includes such software instructions is capable of violating the policies of the data processing system 110 even if it did not perform sneaky redirects or cloaking yet. Upon detecting a policy label in association with a given asset, the violation detection module 130 can provide an indication of that asset to the asset clustering module 135

The asset-clustering module 135 can identify a node, referred to herein as a seed node, in the network of nodes 200 associated with the asset having (or mapped to) the policy label (e.g., involved in or capable of policy violation). The identified node (or seed node) can be the node representing the asset identified to be associated with the policy label or another node, for example, corresponding to an asset of a given type that is related to the asset identified to be associated with the policy label. For example, referring back to FIG. 2, the node pointed by the white arrow can represent the asset identified to be associated with the policy label. Here, the asset identified to be associated with the policy label can be a data file, for example, including a malware file. However, the asset-clustering module 135 can identify the node 204b, pointed to by the gray arrow, which represents a website domain that has some relationship (or correlation) with the asset identified to be associated with the policy label. For example, the data file identified to be associated with the policy label can be provided, in this case, by a landing page (or webpage) that is part of the website domain represented by node 204b.

The asset-clustering module 135 can be interested in an asset of a specific type (e.g., website domain or host among other asset types) that is in relationship with the asset identified to be associated with the policy label. Specifically, the asset-clustering module 135 can be configured to carry asset clustering for assets of a predefined type and can start the clustering process at a seed node corresponding to an asset that is of the predefined type and that has some relationship (or correlation) with the asset identified to be associated with the policy label. Performing asset clustering among a subset of the nodes (e.g., associated with a predefined asset type) of the network of nodes 200 can significantly reduce the computational cost and time of the asset clustering process. Traversing all nodes of a large network of nodes (e.g., having millions of nodes) can be computationally inefficient and can induce latency with regard to the asset clustering process. In some implementations, the asset-clustering module 135 can start the asset clustering process at a node corresponding to an asset identified to be directly associated with the policy label, and can traverse all nodes of the network of nodes 200.

Each asset can have a respective identifier and each node in the network of nodes 200 can include (e.g., as metadata or as an identifier of the node itself) an identifier of the corresponding asset. The asset-clustering module 135 can search the network of nodes 200 for the node having the identifier of the asset identified to be associated with the policy label. In some implementations, the database 145 can include a data structure mapping asset identifiers to identifiers of corresponding nodes in the network of nodes 200. The asset-clustering module 135 can use such data structure to locate the node corresponding to the asset identified to be directly associated with the policy label within the network of nodes 200. Once the asset-clustering module 135 identifies the node corresponding to the asset identified to be directly associated with the policy label, it can use links connected to that node to identify another node corresponding to an asset of the predefined type that is in relationship (or correlation) with the asset identified to be directly associated with the policy label.

The asset-clustering module 135 can identify a set (or combination) of two or more attributes of the seed node (or corresponding asset) identified to be directly associated with the policy label. The asset-clustering module 135 can identify the set of attributes for use to identify other assets that belong to the same owner or content source as the asset (or corresponding seed node) identified to be directly associated with the policy label. Usually, the more attributes are used to cluster the assets or corresponding nodes, the higher is the expected clustering precision. For instance, using a single attribute is often not sufficient to produce high-precision clusters. As an example, the fact that two domains are connected either to the same content provider account, the same IP address, or the same resource does not necessarily imply that they belong to the same content source (or the actor behind the activity or behavior associated with the policy label). For example, two otherwise unrelated website domains can share the same IP address by virtual hosting (e.g., they can be hosted by the same physical server on a cloud). Also, different content provider accounts can have respective content items landing on the same open source content sharing platform (e.g., YOUTUBE). Furthermore, a given resource can be loaded by otherwise unrelated domains, for example, because the websites hosted by the domains happen to be created using the same content management system (e.g., WordPress). However, when a group of domains (or other assets), or corresponding nodes, shares a combination of two or more independent attributes, that is often a strong indication that the domains (or other assets) are created, provided or used by the same content source (e.g., content provider entity or agents thereof).

The asset-clustering module 135 can identify the set of attributes using information or data of the network of nodes 200. In particular, the asset-clustering module 135 can identify the set of attributes based on links or immediate neighboring nodes of the seed node within the network of nodes 200. The asset-clustering module 135 can identify the attributes using neighboring nodes that are few hops (e.g., two hops) away from the seed node within the network of nodes 200. The asset-clustering module 135 can identify the attributes using metadata, if any, associated with seed node in the network of nodes 200. For example, the attributes for a website domain can include the content provider account, the payment information, the landing pages, the data files, or any combination thereof among others, associated with that website domain. The attributes for a content provider account can include the website domain(s), the payment information, the landing pages, the data files, or any combination thereof among others, associated with that content provider account. The asset-clustering module 135 can identify the attributes based on a set of predefined attribute types, which were previously tested and shown to provide precise clustering results, for example.

The asset-clustering module 135 can compute, for a subset of nodes in the network of nodes 200, a respective pointwise mutual information (PMI) score. The PMI score can be indicative of a likelihood that nodes within the subset of nodes that share the set (or combination) of two or more attributes are associated with a common content source (e.g., a common third-party content provider). The subset of nodes can be defined, for example, as the nodes in the network of nodes 200 having the same type as the seed node (e.g., nodes corresponding to web site domains or nodes corresponding to hosts, among other types of nodes). In some implementations, the subset of nodes can be defined in other ways (e.g., not based on a predefined asset type). Nodes within the subset of nodes can share the set of attributes either accidentally (e.g., randomly), or by design if such nodes belong to a common content source (e.g., a third-party content provider and/or respective agents). The asset-clustering module 135 can use the PMI score to distinguish between cases of random sharing of the set attributes by a group of nodes (or corresponding assets) versus the group of nodes sharing the set of attributes as a result of being associated with single content source. The asset-clustering module 135 can use information provided by network of nodes 200, e.g., links between pairs of nodes, to compute the PMI score for the subset of nodes. For instance, the asset-clustering module 135 can consider, for a given node, immediate neighboring nodes, neighboring nodes that are few (e.g., two) hops away within the network of nodes 200 or both to determine whether or not an attribute is associated with the given node. In some implementations, the asset-clustering module 135 can consider metadata associated with the given node to determine whether the attribute is associated with the given node.

Considering a set of two attributes including attribute A and attribute B, the asset-clustering module 135 can compute the PMI score for the subset of nodes as:

$$PMI(A, B) = \frac{P(A, B)}{P(A) \times P(B)}, \quad (1)$$

where P(A) represents a probability that the attribute A is associated with a node within the subset of nodes. P(B) represents a probability that the attribute B is associated with the node within the subset of nodes. P(A,B) represents a joint probability that both attributes A and B are associated with the node within the subset of nodes. The asset-clustering module 135 can compute the probabilities P(A), P(B) and P(A,B) empirically. For example, let the attribute A be indicative of a website domain being associated with a given payment information. A website domain can be deemed to be associated with a payment information if the website domain and the payment information are both associated with the same content provider account. The attribute B can be indicative of a website domain serving or providing a given data file. The asset-clustering module 135 can estimate P(A) empirically as the number of domains (or the number of corresponding nodes in the subset of nodes) associated with the payment information divided by the total number of domains (or the total number of nodes in the subset of nodes). Similarly, the asset-clustering module 135 can estimate P(B) empirically as the number of domains (or the number of corresponding nodes in the subset of nodes) associated with the data file divided by the total number of domains (or the total number of nodes in the subset of nodes). Also, the asset-clustering module 135 can estimate P(A,B) empirically as the number of domains (or the number of corresponding nodes in the subset of nodes) associated with both the payment information and the data file divided by the total number of domains (or the total number of nodes in the subset of nodes).

Equation (1) can also be written as:

$$PMI(A, B) = \frac{P(A/B)}{P(A)} = \frac{P(B/A)}{P(B)}, \quad (2)$$

where P(A/B) represents the conditional probability that the attribute A is associated with a node of the subset of nodes given that the attribute B is already associated with the node, and P(B/A) represents the conditional probability that the attribute B is associated with the node given that the attribute A is already associated with the node.

For a set of a set (or combination) of n attributes $X_1, X_2, \ldots, X_n$, the asset-clustering module 135 can compute the PMI score for the subset of nodes as:

$$PMI(X_1, \ldots, X_n) = \frac{P^{(n-1)}(X_1, \ldots, X_n)}{\prod_{j=1}^{n} P(X_1, \ldots, X_{j-1}, X_{j+1}, \ldots, X_n)}, \quad (3)$$

where $P(X_1, \ldots, X_n)$ represents a first joint probability that all the attributes $X_1, \ldots, X_n$ are associated with a node of the subset of nodes, and $P(X_1, \ldots, X_{j-1}, X_{j+1}, \ldots, X_n)$ represents a second joint probability that all the attributes $X_1, \ldots, X_n$ except attribute $X_j$ are associated with the same node. Note here that n represents a positive integer.

In some implementations, the asset-clustering module 135 can allocate different weights to different attributes when computing the PMI score. For example, the asset-clustering module 135 can use a weighted version of the PMI score in equation (1) as:

$$PMI(A, B) = \frac{P(A, B)}{\alpha_A P(A) \times \alpha_B P(B)}, \quad (4)$$

where $\alpha_A$ and $\alpha_B$ represent weighting values for the attributes A and B, respectively. Using distinct weighting values for different attributes can allow for allocating different ranks or different degrees of importance to distinct attributes when computing the PMI score.

In some implementations, PMI scores may be computed by functions of the right-hand-side of (1), (2), (3), or (4), or their respective approximations. For example, PMI(A, B) may be computed by using the following equation $$PMI(A, B) = f\left(\frac{P(A, B)}{P(A) \times P(B)}\right),$$

where f(•) denotes a real function. In one example, f(•) maybe the logarithm function. As such, $$PMI(A, B) = \log\left(\frac{P(A, B)}{P(A) \times P(B)}\right),$$

where log denotes the logarithm function to a known base, e.g. 2. In another case, PMI scores may also be weighted according to the probability of the attributes. For example, PMI(A, B) may be computed by the following equation $$PMI(A, B) = P(A, B) f\left(\frac{P(A, B)}{P(A) \times P(B)}\right).$$

In an example where f(•) is the logarithm function, we have $$PMI(A, B) = P(A, B) \log\left(\frac{P(A, B)}{P(A) \times P(B)}\right).$$

Similar extensions can be made to PMI scores defined with n attributes in (3) or their weighted version in (4). Further note that for simplicity in computation, approximate or fixed point computation of PMI scores may be used in practice.

The asset-clustering module 135 can identify, using the PMI score associated with the subset of nodes, a cluster of nodes in the heterogeneous network of nodes including the set (or combination) of two or more attributes. Specifically, the asset-clustering module 135 can determine, based on the value of the PMI score for the subset of nodes with respect to the set of attributes, whether nodes (within the subset of nodes) sharing the set of attributes represent a cluster of assets that is associated with a single content source (e.g., a single content provider and/or respective agents). The asset-clustering module 135 can compare the PMI score to a predefined threshold value. If the PMI score exceeds (or is greater than or equal to) the predefined threshold value, the asset-clustering module 135 can identify all nodes within the subset of nodes that share (or associated with) the set of attributes and form a cluster consisting of such nodes. In some implementations, the threshold value can be equal to one. In some implementations, the asset-clustering module 135 or the data processing system 110 can test (e.g., based on training or testing data) a plurality of threshold values and select one, for example, that provides the best clustering precision-recall tradeoff. The threshold value used can depend on, for example, the PMI formula (such as those described in equations (1)-(4)) used by the asset-clustering module 135.

A relatively high PMI value is indicative of some hidden relationship (or hidden design) between the nodes within the subset of nodes, or the corresponding assets, that share the set of attributes. Specifically, a relatively high PMI value indicates that the nodes within the subset of nodes, or the corresponding assets, that share the set of attributes most likely belong to the same content source.

Figure 3:
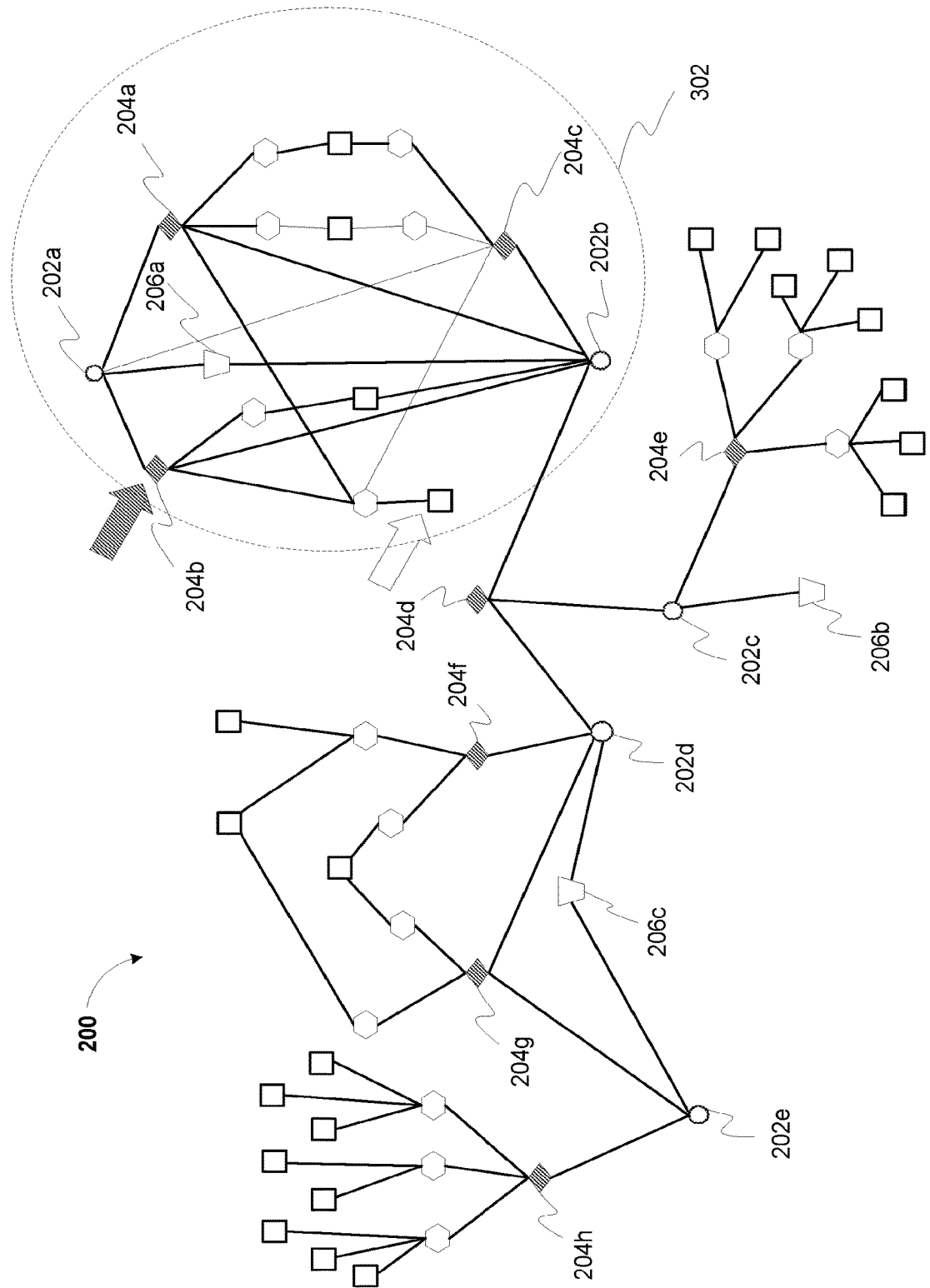
FIG. 3 is a diagram illustrating a clustering result within the network of nodes of FIG. 2, according to an illustrative implementation.

Referring to FIG. 3, a diagram illustrating a clustering result within the network of nodes 200 is shown. In this case, and as discussed before, the asset-clustering module 135 defines the subset of nodes as the hexagonal nodes 204a-204h (shown in gray in FIG. 3) representing domain assets. Using the PMI score, for example, for the attributes indicative of an association with the content provider accounts 202a and 202b (both are associated with the seed node 204b) and an association with the landing page that served a given data file (in this case the data file identified to be directly associated with the policy label or policy violation), the asset-clustering module 135 can identify the cluster 302 as belonging to (or associated with) a single content source.

In some implementations, the cluster can include nodes from the subset of nodes as well as other nodes of the network of nodes 200. For example, the asset-clustering module 135 can identify the group of nodes within the subset of nodes (e.g., nodes corresponding to domains) having the set of attributes. In the example of FIG. 3, the asset-clustering module 135 can first identify the group of nodes 204a-204c. The asset-clustering module 135 can then identify, for example, the content provider accounts associated with identified group of nodes having (or sharing) the set of attributes. The asset-clustering module 135 can then identify all nodes (or assets) associated with identified content provider nodes as the nodes forming the cluster. For example, in the example shown in FIG. 3, the asset-clustering module 135 can identify the content provider accounts 202a and 202b as being associated with the domains 204a-204c, and then identify the cluster 302 as all the nodes, or corresponding assets, in the content provider accounts 202a and 202b. In some implementations, the asset-clustering module 135 can employ a different approach to identify all the nodes (or assets) of different types in the cluster. The cluster of assets includes the asset identified to be directly associated with the policy label.

The policy classifier module 140 can store, in one or more data structures, an association between the cluster of nodes identified by the asset-clustering module 135 and a tag based on the first asset identified to be directly associated with the policy label of the policy of the content distribution system. The policy classifier module 140 can use tag to categorize a first set of assets of the plurality of assets corresponding to the cluster of nodes 200. For example, the policy classifier module 140 can use tag to categorize assets, or a set of assets, as rogue, malicious, suspicious, or blocked, among other categorizations. In other words, since the cluster (e.g., cluster 302) of nodes represents assets corresponding to a single content source and including the asset identified to be associated with the policy label, the cluster can be viewed as representing assets belonging to (or associated with) an entity that violated at least one policy of the data processing system 110 or that is the source of an activity or behavior that is the subject of the policy label. As such, the policy classifier module 140 can tag the whole cluster (or assets thereof) as suspicious, rogue, untrustworthy, or malicious among other categorizations. The policy classifier module 140 can prevent or restrict provisioning of (or providing) one or more assets, such as data files, landing pages or content items, of the cluster (or tagged assets) to client devices 135. The policy classifier module 140 can prevent or restrict one or more assets of the cluster from participating in any content distribution activity. For example, the policy classifier module 140 can prevent or restrict the content provider accounts in the cluster from participating in any auction to provide third-party content to client devices 135.

The PMI-based clustering approach can use both local and global information. Locally, the data processing system 110 can consider the set of common neighbors (e.g., to define attributes) for a set of nodes in the network of nodes. Globally, the data processing system 110 can use the total number of nodes (e.g., domains) in order to compute the probabilities that constitute the PMI score. Note that the clusters could be ranked using the local information alone, since the product PMIxn does not depend on the total number of domains n, for example, which is common for all clusters. However, the threshold for high-precision clusters will still depend on n or some other global information (e.g. the PMI score quantile). Since the proposed clustering approach is primarily a local approach, it allows to efficiently update the clusters when the network of nodes is modified, for example, slightly. However, global methods would have to re-compute all clusters from scratch, even when a single node or relationship changes. The proposed clustering approach is also easier to implement on distributed systems, as it typically does not require a large amount of shared memory. The PMI-based clustering described above, by virtue of relying mostly on local information, naturally lends itself to online implementation. Specifically, the size of the graph (or network of nodes) and the attributes or links associated with its nodes, which are used to formulate or compute the PMI score can be easily updated as new entities and relationships are added to the graph in real time.

Figure 4:
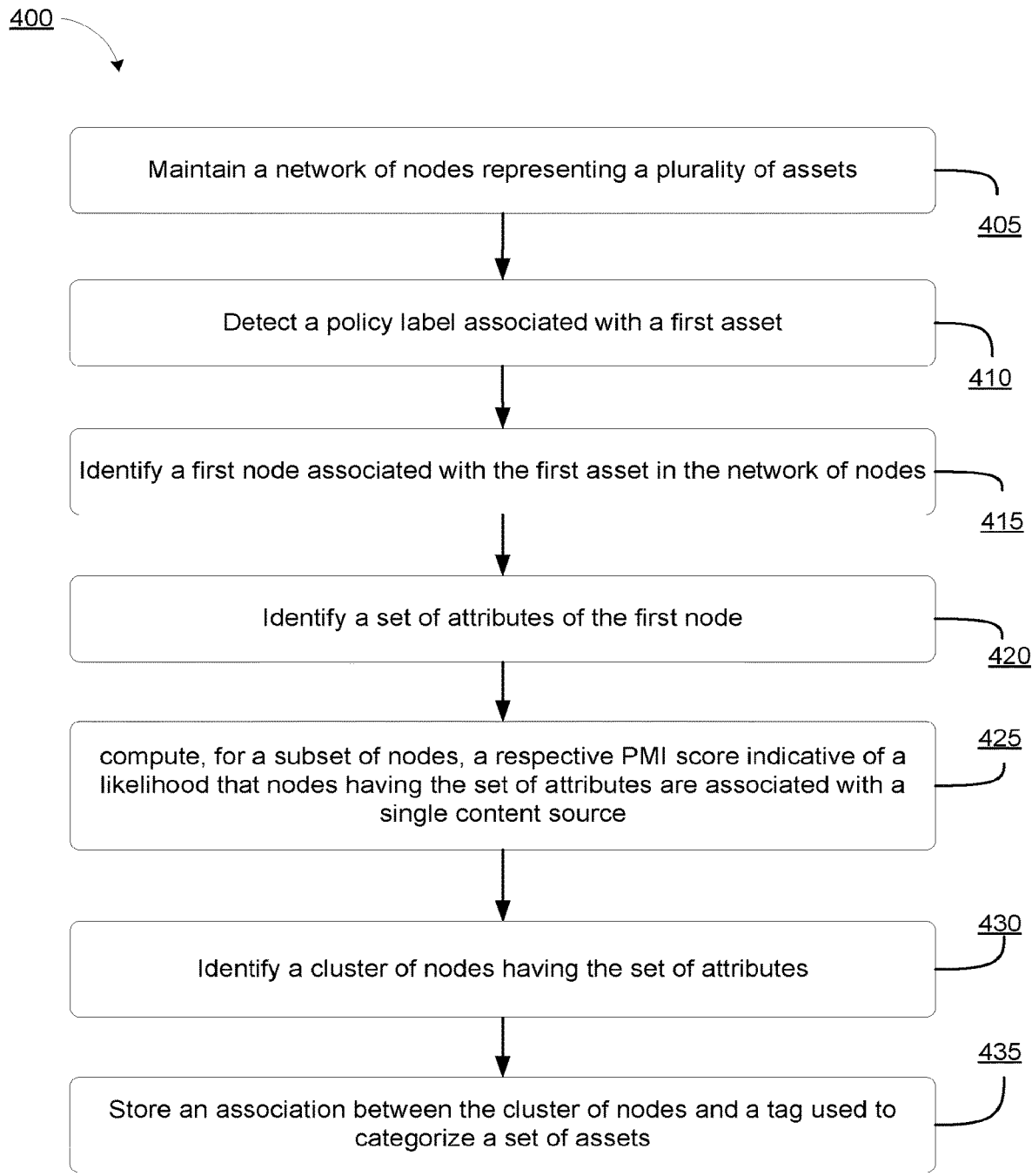
FIG. 4 is a flow chart illustrating a method for enforcing policies associated with content distribution, according to an illustrative implementation.

Referring to FIG. 4, a flow chart illustrating a method 400 for enforcing policies associated with content distribution is described. The method 400 can include maintaining a network of nodes representing a plurality of assets (STEP 405). The method 400 can include detecting a first asset of the plurality of assets has, or is associated with, a policy label of policy (STEP 410), and identifying a first node associated with the first asset in the network of nodes (STEP 415). The method 400 can include identifying a plurality of attributes of the first node (STEP 420), and computing, for a subset of nodes in the network of nodes, a respective PMI score indicative of a likelihood that nodes having the plurality of attributes are associated with a single content source (STEP 425). The method 400 can include identifying a cluster of nodes having the plurality of attributes (STEP 430), and storing an association between the cluster of nodes and a tag used to categorize a set of assets (STEP 435).

Referring to FIGS. 1-4, the method 400 can be performed by the data processing system 110 as discussed above with regard to FIGS. 1-3. For example, the network of nodes can be a heterogeneous network of nodes, such as network of nodes 200, with the respective nodes representing assets of at least two different types. The assets can be associated with, for example, a plurality of third-party content providers. The policy label detected in association with the first asset can be indicative of a violation of a policy of the data processing system 110, for example, related content distribution, a classification of an asset activity or asset behavior, or the like.

The PMI-based clustering is described above with regard to the application of identifying assets associated with a single content source, for example, by content distribution system. However, in general, the clustering method(s) described above can be applied to classification problems where entities can be of multiple types and relationships between the entities can be naturally represented as a graph (or network of nodes). It is especially useful when ground truth class labels are non-existent or difficult to obtain, e.g., in an unsupervised or semi-supervised setting. In such cases, the high-precision clusters generated by the PMI-based clustering method(s) described above can serve as a replacement for the ground truth data. In the semi-supervised setting, PMI-based clustering can allow to extrapolate the few existing ground truth labels to the entire clusters. Note that, due to the high precision of the clusters, the PMI-based clustering does not require labeling a majority of the examples in a cluster. Instead, a single labeled example can suffice to be extrapolated to the entire cluster. As such, PMI-based clustering naturally fits the few-shot classification setting. In an unsupervised setting, the high-precision clusters can be used to bootstrap a manual labeling process effectively. In many applications, including the one described above with regard to identifying potentially rogue or suspicious assets in content distribution system, it is easier to review and label the entire cluster of related entities than each entity individually. The context provided by the high-precision cluster makes the manual review and labelling process more efficient and robust.

The applications that are particularly suitable for employing the PMI-based clustering described above include abuse detection, such as payment fraud, spam and organized crime groups among others. Abuse networks tend to have a certain degree of redundancy, which makes them more resilient to enforcement. The PMI-based clustering described above can derive high-precision features from this redundancy. In the abuse networks, nodes can represent publishers, HTTP cookies, advertising campaigns or a combination thereof among others. The links in the abuse networks can represent publisher-cookie relationships, publisher-campaign relationships and/or cookie-campaign relationships.

Another example application is anomaly detection in websites, which calls for grouping websites and recognizes unusual patterns. The nodes in a network of nodes for this application can represent domain names, IP addresses, registrant information from WhoIs Domain Lookup, or a combination thereof among others. The attributes of the nodes can include webpage resources (e.g., images, texts, etc.), registration time, domain visit count if available or a combination thereof among others. The links in the network of nodes can represent relationships between a domain and IP address, a domain and a registrant information, a domain and another domain, or a combination thereof among others.

Another example application financial risk forecasting. In such an application, the risk that a stock loses value can be predicted with high accuracy given high-precision clusters of similar stocks and just one or a few examples of defaulting stocks in each cluster. The network of nodes in this application can include nodes representing stock symbols and news websites, among others. The node attributes can include industry, quarterly report, news report content digest, news report age, or a combination thereof among others. The links in the network of nods can represent (stock symbol, stock symbol) pairs and (stock symbol, news website) pairs.

Another example application for employing PMI-based clustering is social network analysis, where the goal is to self-organized communities in a large-scale social network. The nodes in this case can represent user accounts, client devices from which user accounts are accessed, IP addresses used to access user accounts, posts shared viewed by user accounts, posts viewed by a user accounts or a combination thereof among others. The links can represent friendship relationships between user accounts, relationships between a user account and client devices and/or IP addresses from which the user account is accessed, relationships between a user account and posts viewed or shared by that account, or a combination thereof among others.

Another application where PMI-based clustering is insurance forecasting where the target is to estimate the likelihood and amount of claims given high-precision clusters of insured properties and a small number of examples from each cluster where claims have been issued.

Another application where PMI-based clustering is epidemic forecasting. High-precision clusters of individuals vulnerable to infections can allow accurate targeting of vaccination programs at the initial stage, when only few cases of a new epidemic are known. The online nature of the proposed clustering method is particularly helpful in this application.

Another application where PMI-based clustering is similar audience targeting. In advertisement, online marketing, entertainment, etc., the concept of similar audience plays a central role. High-precision clusters allow for expanding the reach from a small number of examples of successful targeting to a larger audience.

Another application where PMI-based clustering is discovery of protein complexes in protein-protein interaction networks. High-precision clusters allow generalizing known interactions from just a few proteins to the entire cluster.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 5:
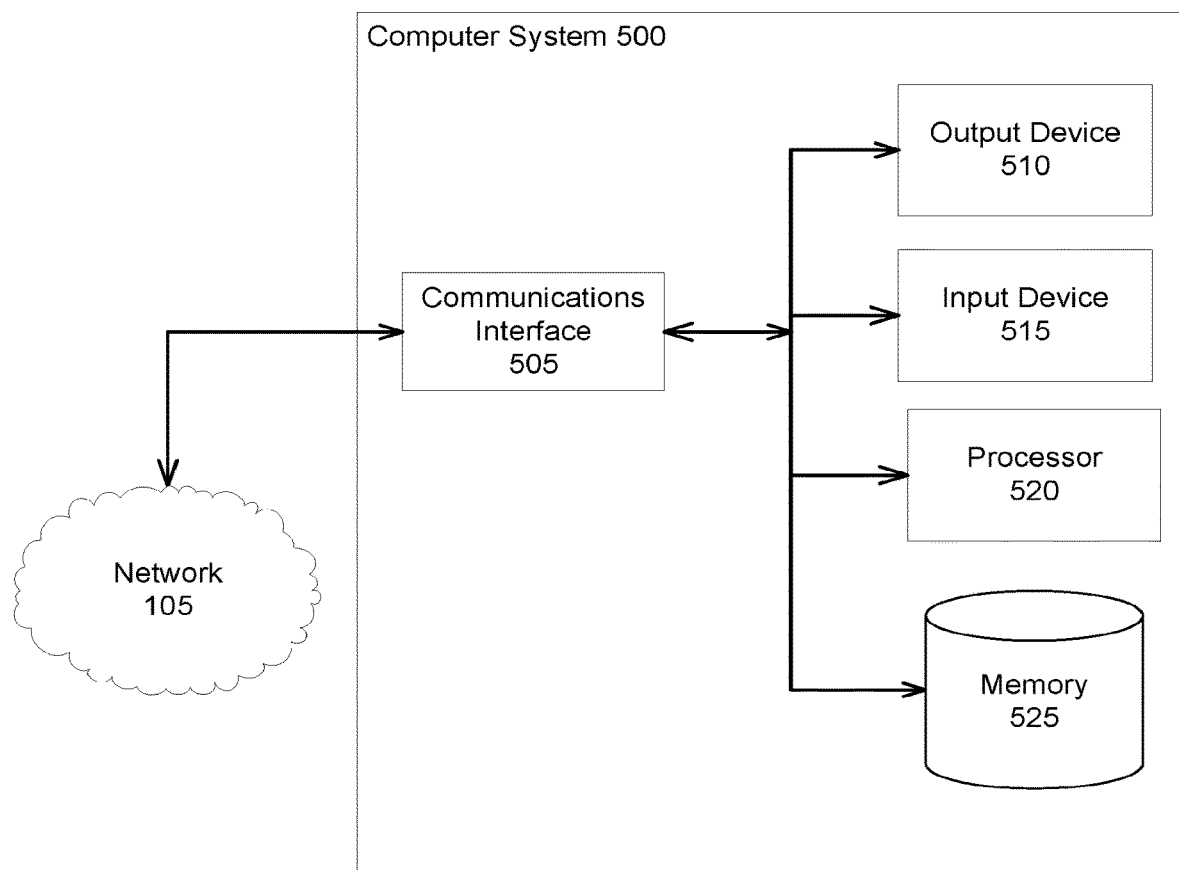
FIG. 5 shows the general architecture of an illustrative computer system, according to an illustrative implementation.

FIG. 5 shows the general architecture of an illustrative computer system 500 that may be employed to implement any of the computer systems discussed herein, including the system 110 and its components such as the violation detection module 130, the asset-clustering module 135, and the policy classifier module 140, in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the violation detection module 130, the asset-clustering module 135, and the policy classifier module 140.

In the computer system 500 of FIG. 5, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the environment 100 of FIG. 1, the data processing system 110 can include the memory 525 to store data structures and/or information related to, for example, the network of nodes or the PMI score, among others. The memory 525 can include the database 145. The processor(s) 520 shown in FIG. 5 may be used to execute instructions stored in the memory 625 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 500. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content, which is then displayed on the television screen or other display device. A smart television module may be configured to provide a home screen or top-level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130 and the content selection module 135 can include or share one or more data processing apparatuses, computing devices, or processors.

A computer program (also known as a program, software, software application, script, or code) can be written in any form of programming language, including compiled or interpreted languages, declarative or procedural languages. The computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system 500 can include content provider computing device 115, publisher computing devices 120, client devices 125, or servers or computing devices of the data processing system 110. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130 and the content selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system comprising:
at least one processor; and
a memory storing computer-executable instructions, the computer-executable instructions, when executed by the at least one processor, cause the at least one processor to:
maintain a heterogeneous network of nodes including a plurality of nodes and edges connecting respective pairs of nodes, each node of the plurality of nodes representing a respective asset of a plurality of assets corresponding to a plurality of content sources, the plurality of assets including at least one asset of a first asset type and at least one asset of a second asset type;
detect that a first asset of the plurality of assets has a label associated with a policy of a content distribution system;
identify in the heterogeneous network of nodes, a first node associated with the first asset;
identify a combination of two or more attributes of the first node;
compute, for a subset of nodes in the heterogeneous network of nodes, a respective pointwise mutual information (PMI) score indicative of, based on the pairs of nodes, a likelihood that nodes of the subset of nodes having the combination of two or more attributes are associated with a single content source, wherein a PMI score indicative of a likelihood that nodes of the subset of nodes having a combination of n attributes $X_1, X_2, \ldots, X_n$ are associated with a single content source is defined as $$PMI(X_1, \ldots, X_n) = \frac{P^{(n-1)}(X_1, \ldots, X_n)}{\prod_{j=1}^{n} P(X_1, \ldots, X_{j-1}, X_{j+1}, \ldots, X_n)},$$

where $P(X_1, \ldots, X_n)$ represents a first joint probability that all the attributes $X_1, \ldots, X_n$ are associated with a node of the subset of nodes, and $P(X_1, \ldots, X_{j-1}, X_{j+1}, \ldots, X_n)$ represents a second joint probability that all the attributes $X_1, \ldots, X_n$ except attribute $X_j$ are associated with the node the subset of nodes;
  identify, using the PMI score associated with the subset of nodes, a cluster of nodes in the heterogeneous network of nodes including the combination of two or more attributes; and
  store, in one or more data structures, an association between the cluster of nodes and a tag based on the first asset having the label associated with the policy of the content distribution system, the tag used to categorize a first set of assets of the plurality of assets corresponding to the cluster of nodes.

2. The system of claim 1, wherein the computer-executable instructions, when executed by the at least one processor, further cause the at least one processor to restrict provisioning of one or more assets of the first set of assets.

3. The system of claim 1, wherein the first asset type or the second asset type includes at least one of content provider accounts, website domains, information resources, Internet Protocol (IP) addresses, data files, content items, or payment information.

4. The system of claim 1, wherein the computer-executable instructions, when executed by the at least one processor, further cause the at least one processor to select each node of the subset of nodes based on an asset type of the first node.

5. The system of claim 4, wherein the asset type of the first node corresponds to website domains.

6. The system of claim 1, wherein a PMI score indicative of a likelihood that nodes of the subset of nodes having attribute A and attribute B are associated with a single content source is defined as $$PMI(A, B) = \frac{P(A, B)}{P(A) \times P(B)},$$

where $P(A)$ represents a probability that the attribute A is associated with a node of the subset of nodes, $P(B)$ represents a probability that the attribute B is associated with the node of the subset of nodes, and $P(A,B)$ represents a joint probability that both attributes A and B are associated with the node of the subset of nodes.

7. The system of claim 1, wherein in identifying the cluster of nodes includes:
  comparing the respective PMI score for the subset of nodes to a predefined threshold value; and
  determining that the nodes including the combination of two or more attributes belong to the cluster of nodes if the respective PMI score exceeds the predefined threshold value.

8. The system, of claim 1, wherein the edges connecting the respective pairs of nodes include at least one of:

a first edge between a first pair of nodes including a third node representing a first website domain and a fourth node representing a first content provider account, the first edge indicating that at least one content item associated with the first content provider account includes a link referencing a first information resource associated with the first website domain;
a second edge between a second pair of nodes including a fifth node representing a second content provider account and a sixth node representing a payment information associated with the second content provider account;
a third edge between a third pair of nodes including a seventh node representing a second website domain and an eighth node representing an Internet Protocol (IP) address associated with the second website domain; or
a fourth edge between a fourth pair of nodes including a ninth node representing a third website domain and a tenth node representing a second information resource associated with the third website domain.

9. The system of claim 1, wherein detecting that the first asset of the plurality of assets has the label associated with the policy of the content distribution system includes detecting distribution of malicious software or offensive contents.

10. A method comprising:
maintaining, by a data processing system including one or more processors, a heterogeneous network of nodes including a plurality of nodes and edges connecting respective pairs of nodes, each node of the plurality of nodes representing a respective asset of a plurality of assets corresponding to a plurality of content sources, the plurality of assets including at least one asset of a first asset type and at least one asset of a second asset type;
detecting, by the data processing system, that a first asset of the plurality of assets has a label associated with a policy of a content distribution system;
identifying, by the data processing system, in the heterogeneous network of nodes, a first node associated with the first asset;
identifying, by the data processing system, a combination of two or more attributes of the first node;
computing, by the data processing system, for a subset of nodes in the heterogeneous network of nodes, a respective pointwise mutual information (PMI) score indicative of, based on the pairs of nodes, a likelihood that nodes of the subset of nodes having the combination of two or more attributes are associated with a single content source, wherein a PMI score indicative of a likelihood that nodes of the subset of nodes having a combination of n attributes $X_1, X_2, \ldots, X_n$ are associated with a single content source is defined as $$PMI(X_1, \ldots, X_n) = \frac{P^{(n-1)}(X_1, \ldots, X_n)}{\prod_{j=1}^{n} P(X_1, \ldots, X_{j-1}, X_{j+1}, \ldots, X_n)},$$

where $P(X_1, \ldots, X_n)$ represents a first joint probability that all the attributes $X_1, \ldots, X_n$ are associated with a node of the subset of nodes, and $P(X_1, \ldots, X_{j-1}, X_{j+1}, \ldots, X_n)$ represents a second joint probability that all the attributes $X_1, \ldots, X_n$ except attribute $X_j$ are associated with the node the subset of nodes;
identifying, by the data processing system, using the PMI score associated with the subset of nodes, a cluster of nodes in the heterogeneous network of nodes including the combination of two or more attributes; and storing, by the data processing system, in one or more data structures, an association between the cluster of nodes and a tag based on the first asset having the label associated with the policy of the content distribution system, the tag used to categorize a first set of assets of the plurality of assets corresponding to the cluster of nodes.

11. The method of claim 10, further comprising restricting, by the data processing system, provisioning of one or more assets of the first set of assets.

12. The method of claim 10, wherein the first asset type or the second asset type includes at least one of content provider accounts, website domains, information resources, Internet Protocol (IP) addresses, data files, content items, or payment information.

13. The method of claim 10, further comprising selecting, by the data processing system, each node of the subset of nodes based on an asset type of the first node.

14. The method of claim 10, wherein a PMI score indicative of a likelihood that nodes of the subset of nodes having attribute A and attribute B are associated with a single content source is defined as $$PMI(A, B) = \frac{P(A, B)}{P(A) \times P(B)},$$

where P(A) represents a probability that the attribute A is associated with a node of the subset of nodes, P(B) represents a probability that the attribute B is associated with the node of the subset of nodes, and P(A,B) represents a joint probability that both attributes A and B are associated with the node of the subset of nodes.

15. The method of claim 10, wherein identifying the cluster of nodes includes:
comparing the respective PMI score for the subset of nodes to a predefined threshold value; and
determining that the nodes including the combination of two or more attributes belong to the cluster of nodes if the respective PMI score exceeds the predefined threshold value.

16. The method of claim 10, wherein the edges connecting the respective pairs of nodes include at least one of:
a first edge between a first pair of nodes including a third node representing a first website domain and a fourth node representing a first content provider account, the first edge indicating that at least one content item associated with the first content provider account includes a link referencing a first information resource associated with the first website domain;
a second edge between a second pair of nodes including a fifth node representing a second content provider account and a sixth node representing a payment information associated with the second content provider account;
a third edge between a third pair of nodes including a seventh node representing a second website domain and an eighth node representing an Internet Protocol (IP) address associated with the second website domain; or
a fourth edge between a fourth pair of nodes including a ninth node representing a third website domain and a tenth node representing a second information resource associated with the third website domain.

17. The method of claim 10, wherein detecting that the first asset of the plurality of assets has the label associated with the policy of the content distribution system includes detecting distribution of malicious software or offensive contents.

18. A non-transitory computer-readable medium storing computer-executable instructions, the computer-executable instructions, when executed by at least one processor, cause the at least one processor to:
maintain a heterogeneous network of nodes including a plurality of nodes and edges connecting respective pairs of nodes, each node of the plurality of nodes representing a respective asset of a plurality of assets corresponding to a plurality of content sources, the plurality of assets including at least one asset of a first asset type and at least one asset of a second asset type;
detect that a first asset of the plurality of assets has a label associated with a policy of a content distribution system;
identify in the heterogeneous network of nodes, a first node associated with the first asset;
identify a combination of two or more attributes of the first node;
compute, for a subset of nodes in the heterogeneous network of nodes, a respective pointwise mutual information (PMI) score indicative of, based on the pairs of nodes, a likelihood that nodes of the subset of nodes having the combination of two or more attributes are associated with a single content source, wherein a PMI score indicative of a likelihood that nodes of the subset of nodes having a combination of n attributes $X_1, X_2, \ldots, X_n$ are associated with a single content source is defined as $$PMI(X_1, \ldots, X_n) = \frac{P^{(n-1)}(X_1, \ldots, X_n)}{\prod_{j=1}^{n} P(X_1, \ldots, X_{j-1}, X_{j+1}, \ldots, X_n)},$$

where $P(X_1, \ldots, X_n)$ represents a first joint probability that all the attributes $X_1, \ldots, X_n$ are associated with a node of the subset of nodes, and $P(X_1, \ldots, X_{j-1}, X_{j+1}, \ldots, X_n)$ represents a second joint probability that all the attributes $X_1, \ldots, X_n$ except attribute $X_j$ are associated with the node the subset of nodes;
identify, using the PMI score associated with the subset of nodes, a cluster of nodes in the heterogeneous network of nodes including the combination of two or more attributes; and
store, in one or more data structures, an association between the cluster of nodes and a tag based on the first asset having the label associated with the policy of the content distribution system, the tag used to categorize a first set of assets of the plurality of assets corresponding to the cluster of nodes.

* * * * *